United States Patent Office 3,331,826
Patented July 18, 1967

3,331,826
POLYMERIZATION OF CONJUGATED DIOLEFINS WITH A LITHIUM BASED CATALYST AND A HYDROCARBON CHAIN TERMINATOR
Thomas B. Talcott, Wadsworth, Ohio, assignor to The Firestone Tire & Rubber Company, Akron, Ohio, a corporation of Ohio
No Drawing. Filed Mar. 30, 1964, Ser. No. 355,935
13 Claims. (Cl. 260—94.2)

This application is a continuation-in-part of copending application Ser. No. 61,363, filed Oct. 10, 1960, now abandoned.

This invention relates to the use of hydrocarbon chain-terminators (often called modifiers) in the production of elastomers by polymerization of conjugated dienes, both with and without comonomers, employing either lithium or an organolithium compound as catalyst. The polymerization is generally carried out in solution in an organic solvent, although the modifiers are also useful in bulk polymerizations. The invention relates more particularly to such polymerizations of butadiene and isoprene and mixtures thereof.

The modifiers reduce the molecular weight of the polymer produced, and to the extent that the polymer is derived from a conjugated diene, they yield polymer of high cis-1,4 polymer configuration. The chain-terminator may be added to the reaction as a hydrocarbon, or it may be formed in situ by addition of a halide or other compound which reacts with the catalyst to form a lithium compound and the desired hydrocarbon terminator. In its broadest aspects, such modification results in the production of low-molecular weight homopolymers and copolymers.

In the polymerization of conjugated dienes, the modification of the polymerization results in a homopolymer or copolymer of a high cis-1,4 polymer content. If the conjugated diene is butadiene-1,3, the cis-1,4 polymer content may be as high as 60 or 65 percent up to 80 or even 85 percent or higher, with an inherent viscosity as low as 2.5. If the conjugated diene is isoprene, the cis-1,4 polymer content of the homopolymer may be as high as 90 or 95 percent, with an inherent viscosity as low as 5. If the product is isoprene-butadiene copolymer, the cis-content will be high and may be as high as 80 to 90 percent or more. Thus, the cis-1,4 polymer content, although high, will vary, and in copolymers of a conjugated diene and an olefin, the cis-content of the diene portions of the copolymer molecules will be high. The high cis-1,4 polymer content of the homopolymers and copolymers improves certain of their properties, such as their green strength and tack, etc. In the case of polyisoprene, there is an improvement in its rubber-like properties for tire use.

Conjugated dienes used in carrying out the process are usually and preferably those containing 4 to 6 carbon atoms, but they may contain 12 or more carbon atoms. These include, for example:

butadiene
isoprene
2,3-dimethylbutadiene
piperylene
2-methyl-3-ethyl butadiene
3-methylpiperylene
2-methyl-3-ethylpiperylene
2-ethylpiperylene
hexadiene-1,3
2-methylhexadiene-1,3
heptadiene-1,3
3-methylheptadiene-1,3
octadiene-1,3
3-butyloctadiene-1,3
3,4-dimethylhexadiene-1,3
3-n-propylpiperylene
4,5-diethyloctadiene-1,3
2-phenylbutadiene-1,3
2,3-diethylbutadiene-1,3
2,3-di-n-propylbutadiene-1,3
2 - methyl - 3 - isopropylbutadiene - 1,3, etc. including other alkyl- and aryl-substituted butadienes and isoprenes.

The olefins copolymerizable with the conjugated dienes include, for example, styrene, alpha-methyl styrene, and acrylates, methacrylates and ethacrylates from alcohols containing 1 to 8, 10 or 12 or more carbon atoms up to 18 or more, etc.

The copolymers to which reference has been made include, for example, butadiene-styrene and copolymers of butadiene and substituted styrenes, butadiene-isoprene, butadiene - piperylene, isoprene - piperylene, butadiene-acrylates and copolymers of butadiene and substituted acrylates, isoprene-styrene and copolymers of isoprene and substituted styrenes, isoprene-acrylates and copolymers of isoprene and substituted acrylates, piperylene-styrene, butadiene-isoprene-styrene, and homopolymers and copolymers of octadiene and other higher conjugated dienes, etc.

The catalysts of this invention are metallic lithium and organolithium compounds in which the lithium exerts a sufficiently strong reducing action to displace hydrogen from acetylene. The organolithium catalysts referred to herein include the various lithium hydrocarbons, i.e., hydrocarbons in which one or more hydrogen atoms have been replaced by lithium, and adducts of lithium with polycyclic aromatic compounds. Suitable lithium hydrocarbons are for instance alkyl lithium compounds such as methyllithium, ethyllithium, butyllithium, amyllithium, hexyllithium, 2 - ethylhexyllithium and n - hexyldecyl-lithium, and the various isomers thereof. In addition to the saturated aliphatic lithium compounds, unsaturated compounds are also suitable such as allyllithium, methallyl-lithium and the like including polybutadienyllithium, poly-isophenyllithium and alkyl and aryl derivatives thereof. Also included are the dilithium adducts of conjugated dienes and akyl and aryl derivatives of conjugated dienes; and alkyl- and aryl-lithium adducts of conjugated dienes and alkyl and aryl derivatives of conjugated dienes. Aryl, alkaryl and aralkyl lithium compounds such as phenyl-lithium, the several tolyl- and xylyl-lithiums, alpha- and beta-naphthyllithium and the like are also suitable. Mixtures of the various hydrocarbon lithium compounds are also suitable. For instance, a catalyst can be prepared by reacting an initial hydrocarbon lithium compound successively with an alcohol and with an olefin such as isopropylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene di-lithium compounds such as methylenedilithium, ethylene-dilithium, trimethylenedilithium, tetramethylenedilithium, pentamethylenedilithium, hexamethylenedilithium, decamethylenedilithium, octadecamethylenedilithium and 1,2-dilithiumpropane. Other suitable polylithium hydrocarbons are polylithium aryl, aralkyl and alkaryl compounds such as 1,4-dilithiumbenzene, 1,5-dilithiumnaphthalene, 1,2-dilithium-1,3-triphenyl propane, the compound of the formula

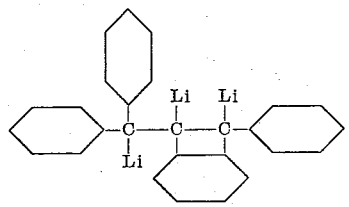

and the like. Tri- and higher lithium hydrocarbons are also suitable, such as 1,3,5-trilithiumpentane or 1,3,5-trilithiumbenzene. Other compounds include the various lithium hydrocarbon amides. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion, the lithium losing an electron to serve as the cation, of the salt. It should be understood that metallic lithium or the various lithium compounds may be used either alone, or in any combination as mixtures with each other.

Reduction of the inherent viscosity of the elastomer produced—in other words its molecular weight—by modification as herein disclosed has economic advantages, such as increased production in a given plant capacity, by permitting polymerization in a more concentrated solution. This results in economy in the amount of the expensive catalyst used. Lower and controlled molecular weight of the final polymer also results in less work for breakdown of the polymer in compounding and the polymer has better processing characteristics.

The modifiers of this invention are compounds having activity in metalation reactions at least as active as the less active diphenylmethane. The activity of lithium in metalation reactions has been recognized in the art. (Advanced Organic Chemistry, by Fuson, John Wiley and Sons, Inc., New York, 1950, page 304; Newer Methods of Preparative Organic Chemistry, translated and revised from the German, published by Interscience Publishers, Inc., New York, 1948, pages 577–578.) Hydrocarbons have been listed in the order of their activity in metalation reactions. (Organo-Metallic Compounds, John Wiley and Sons, Inc. New York, 1960, pages 25–26.)

Certain of the hydrocarbons which it is realized are effective in metalation reactions, have low reactivity as chain terminators in the polymerizations to which this invention relates. These include benzene, toluene, and lower alkanes which have been used as solvents in such polymerizations but their activity as chain terminators is so small under ordinary conditions that it has not been recognized, and such hydrocarbons are not included as chain terminators herein. Only those compounds which are as active as diphenylmethane in replacing lithium are included. These may roughly be divided into three groups as follows, in each of which the modifiers are listed approximately in the order of decreasing activity:

VERY REACTIVE HYDROCARBONS

Acetylene
Cyclopentadiene
9-phenylfluorene
α-Acetylenes (2 - me - 1 - butene - 3 - yne, isopropenyl acetylene, propyne, 1-butyne, etc.)
Indene
3-phenyl indene (2,3-diphenyl indene)
Fluorene (fluorene substituted by an alkyl or aryl group in the 9-position and other positions)
Phenanthrene
Tetraphenylpentadiene
1,4-dihydrobenzene
Dihydronaphthalene
Triphenyl n-butylmethane (the active reagent when chlorotriphenylmethane is added for chain termination)

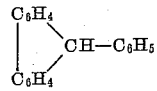

HYDROCARBONS HAVING MODERATE REACTIVITY

Diphenyl methyl biphenyl
9,10-dihydroanthracene
9,10-dihydro-1,2-benzanthracene
1,4-diphenyl-2-butene
Chrysene
Tetraphenylmethane
Cyclopentadiene dimer

HYDROCARBONS HAVING FAIRLY SLUGGISH TO VERY SLUGGISH REACTIVITY

Butyne-2
Triphenylmethane
Diphenyl naphthyl methane
Phenyl-1-naphthylmethane
Phenyl-2-naphthylmethane
Phenyl-p-tolylmethane
Diphenyl methane; 1,1-diphenyl biphenylmethane
Acenaphthene
1,1-diphenylpropene
Phenyl dimethylmethane
Mesitylene; 1,3,5-triphenyl benzene
Anthracene
Naphthalene
Cycloheptatriene
Biphenyl; durol; xylenes
Toluene
Propene
Benzene
Bibenzyl
Ethylene
Ethane (propane, butane, pentane, hexane are of very slightly increasing activity)

Acetylene and compounds more active than acetylene kill the catalyst under usual conditions of polymerization before effective polymerization takes place, but such hydrocarbons may be used under specially controlled unusual reaction conditions.

Products formed in the early stage of the polymerization using triphenylmethyllithium (trityllithium) as catalyst, such as $(C_6H_5)_3C.CH_2.CH:CH.CH_3$ may be used as the modifier.

The activity of the chain terminators varies somewhat with the temperature of the polymerizing reaction mixture, the concentration of the monomer and the chain terminator in the mixture, the solvent employed and with monomer or type of monomer used.

It is not necessary to add the modifier as a hydrocarbon. It may be added in some form reactive with a component of the polymerization reaction mixture to form a hydrocarbon. Thus, a halide or other compound, if added to the polymerizing mixture, may form a hydrocarbon modifier which reacts with the lithium hydrocarbon, as represented by the following equation which supposes that butyllithium is the catalyst, and chlorotriphenylmethane is added:

$$C_4H_9Li + (C_6H_5)_3CCl \rightarrow LiCl + C_4H_9.C(C_6H_5)_3$$

The hydrocarbon formed acts as a chain terminator and polybutadiene of high cis-1,4 polymer content and low inherent viscosity is produced.

The modifiers attack the carbon-bound lithium of the growing polymer chain. They are of such activity that in the concentrations used they do not interfere to a significant extent with the initiation reaction. That is, under the conditions of the polymerization (viz. monomer, modifier, catalyst concentration and temperature) the monomer reacts with the catalyst to initiate chain growth before the modifier can react with it to a significant extent. However, the modifier does react with the carbon-bound lithium of the growing polymer chain (i.e., the "living molecule") to take the lithium and replace it with hydrogen from the modifier to form —CH at the end of the chain. The polymer molecule has then lost its capacity to grow; it is a "dead molecule." The lithium is then part of the modifier. For instance, if fluorene is used as the modifier,

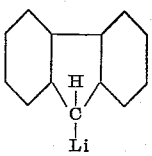

is formed; and if the modifier is triphenylmethane, $(C_6H_5)_3CLi$ is formed.

This exchange of the metal of an organometallic compound for hydrogen of another compound to form another organometallic compound is known as the hydrogen metal interchange or metalation reaction and is used with lithium a great deal to form organolithium compounds. (Fuson, supra.)

The fluorene or triphenylmethane or other modifier has been metalated by the growing chain and a new organolithium compound has been formed. This new compound may or may not initiate new polymer chains depending upon the original modifier used, the reaction temperature, etc. The compounds having metalation activity in the range defined as suitable for use as modifiers do not initiate chain reactions to an excessive extent.

Butyne-2, one of the preferred modifiers of this invention, slowly isomerizes in the presence of a strong base to form ethyl acetylene. The lithium-type catalysts and the carbon-bound lithium of the growing chain are strong bases. Therefore, while polymerization is occurring, the ethyl acetylene is metalated by the carbon-bound lithium of the growing chain, terminating chain growth. Increasing temperature increases the rate of isomerization and therefore the modification of the polymerization is greater at higher temperatures. Other internal acetylenes react similarly.

The art recognizes that the use of increased catalyst reduces the inherent viscosity of the elastomer which is produced, but this decreases the cis-1,4 polymer content and increases the trans-1,4 configuration and the 1,2- and 3,4-additions which are objectionable in elastomers for many uses.

The high polyisoprenes of high cis-1,4-polymer content produced by unmodified polymerization with lithium-type catalyst have inherent viscosities (ordinarily identified by the Greek letter eta) of 12 to 20 in units of 100 ml./g. whereas, inherent viscosities in the range of 4 to 8 are generally preferred. Polyisoprenes with an inherent viscosity of 2 to 3 or lower have inferior physical properties. In polyisoprene, a high cis-1,4 polymer content is necessary if the polymer is to be used in replacement of natural rubber in certain usages as in large, high-speed tires. Rubber which contains about 90 percent or more cis-1,4 configuration with satisfactory inherent viscosity is obtainable with the use of the modifiers of this invention during polymerization.

The preferred inherent viscosity range of polybutadiene for tire usage is from 1.5 to 3.0 which corresponds to a molecular weight of 100,000 to 300,000. Polymers below 1.5 in inherent viscosity produce final vulcanizates which have inferior physical properties. Polymers with inherent viscosities of more than 3.0 are difficult to process. Therefore, modifiers are valuable in control of inherent viscosity of butadiene polymerized in non-aqueous solutions. Although useful polymers of butadiene are obtained at lower cis-1,4 polymer contents (30 to 35 percent) than for isoprene, the very low cis-, high trans-polybutadiene is not desirable for tire manufacture because of its stiffness. The cis-1,4 polymer content of polybutadiene has been increased by the use of the modifiers of this invention. Cis-1,4 values of 70 percent and above with low inherent viscosities are obtainable by use of these modifiers.

The polymerizations are carried out in inert organic solvents. By inert organic solvents we mean organic solvents or diluents which do not enter into the structure of the resulting polymer. Examples of useful inert solvents are the paraffinic hydrocarbons such as pentane, heptane and hexane; the alicyclic hydrocarbons such as cyclohexane; and the aromatic hydrocarbons such as benzene and toluene. Of these, the paraffinic hydrocarbons, particularly pentane and hexane, and aromatic hydrocarbons, particularly benzene, are preferred. The solvent-to-monomer ratio used is not critical and can be varied over a wide range. The ratio may be varied from zero, as in bulk polymerization, up to 15 or more to 1. However, the preferred solvent-to-monomer range for the polymerization is usually from about 3 to 1 to about 7 to 1.

The polymerization of this invention is usually carried out between 25 and 50° C. and may be conducted from about 0° C. to 90° C. or above, as is usual in polymerization with lithium-based catalyst. It has been found that variation of polymerization temperature, varies the effect of the modifiers on molecular weight and on cis-1,4 polymer content.

The amount of modifier used will depend upon the modifier. With butyne-2, 15 parts per 100 parts of monomer at 50° C. to 70° C. gives good results. The butyne-2 which remains in the reaction mixture can be recovered during solvent recovery by evaporation. Ten parts of triphenylmethane per 100 parts of monomer is satisfactory at 50° C. This would be recovered with coagulant if coagulation is used for recovery of the rubber from the solvent. As little as 0.1 part of fluorene per 100 parts of monomer gives satisfactory results at polymerization temperatures of 25 to 50° C. Pressure reactions are feasible, and vacuum reactions are possible.

The time, temperature and amount of catalyst, modifier and solvent may be varied to produce elastomers having various desirable properties.

Referring to the following examples, all polymerizations were conducted in hexane or pentane in beverage bottles with caps lined with aluminum foil (except in Examples 5 and 9 where extracted inert rubber liners were used). Unless otherwise noted, the isoprene- or butadiene-hexane mix was not passed through a column of any sort and 10 percent of the volume of the mix was boiled off on a sand bath to vent impurities, before adding catalyst. The solvent was purified by washing with $H_2SO_4$, neutralizing with base and distilling. The monomer was purified by washing with a mixture of cuprous chloride and a tall-oil soap solution in water. (In the first eight tables, the amounts of the various reagents are given in parts per 100 parts of the monomer.)

Molecular weights were determined by measurement of the inherent viscosity of dilute polymer solutions in toluene, an accepted method of polymer evaluation. (Advances in Colloid Science, by R. H. Ewart, Interscience Publishers, Inc., New York city, 1946.)

*Example 1.—Butadiene and butyne-2*

A 15 percent solution of butadiene in hexane was percolated through a silica gel column into several beverage bottles. To the control bottle was added 0.003 part TMDL (tetramethylenedilithium). To the experimental bottle was added 0.002 part of TMDL and 13 parts of butyne-2 per 100 parts (by weight) of monomer. Both bottles were capped and put into a polymerizer at 50° C. with end-over-end agitation. Since the experimental sample did not polymerize, another 0.001 part of TMDL was added. After 15 hours, both samples of polymer were isolated by evaporation of solvent and analyzed for microstructure, inherent viscosity and millability. The results are shown in Table I.

Two polybutadienes were made as above, but 0.004 part of ethyllithium was used. To one of these were added 26 parts of butyne-2. After 15 hours these were freed of solvent.

The products of the foregoing are compared in Table I. The polymers made without butyne-2 (inherent viscosity 2.9) crumbled when passed through mill rolls, while one made in the presence of butyne-2 using TMDL sheeted on the mill, and the other made with ethyllithium was a liquid polymer.

TABLE I

|  | Control |  | Control |  |
|---|---|---|---|---|
| Butadiene | 100 | 100 | 100 | 100 |
| Hexane | 565 | 565 | 565 | 565 |
| TMDL | 0.003 | 0.003 |  |  |
| Ethyllithium |  |  | 0.004 | 0.004 |
| Butyne-2 |  | 13 |  | 26 |
| Temp., °C | 50 | 50 | 50 | 50 |
| Milling characteristics | (1) | (2) | (1) | (3) |
| Inherent viscosity | 14.4 |  | 2.9 | Liquid |
| Microstructure: |  |  |  |  |
| cis-1,4-polymer (percent) | 35.4 | 71.4 |  |  |
| trans-1,4-polymer (percent) | 56.1 | 21.8 |  |  |
| 1,2-polymer (percent) | 8.5 | 6.8 |  |  |

1 Crumbles on mill.
2 Sheets in 15 passes.
3 Liquid polymer.

The purpose of this table is simply to demonstrate the modifying effect of butyne-2.

*Example 2.—Butadiene and butyne-2*

A 12 percent solution of butadiene in hexane was polymerized at 70° C. by 0.0064 part of TMDL per 100 parts of butadiene in the presence of 20 parts of butyne-2. The polymer produced had an inherent viscosity of 3.2 and a cis-1,4-polymer content of 72.0. A polymerization run at about the same time at 50° C. in the absence of butyne-2 gave a much higher inherent viscosity and a very low cis-1,4-polymer content. The results are recorded in Table II.

TABLE II

|  | Control |  |
|---|---|---|
| Butadiene | 100 | 100 |
| Hexane | 565 | 566 |
| TMDL | 0.003 | 0.0064 |
| Butyne-2 |  | 20.0 |
| Temp., °C | 50 | 70 |
| Inherent viscosity | 14.4 | 3.2 |
| Microstructure: |  |  |
| cis-1,4-polymer (percent) | 35.4 | 72.0 |
| trans-1,4-polymer (percent) | 56.1 | 21.5 |
| 1,2-polymer (percent) | 8.5 | 6.4 |

*Example 3.—Butadiene and triphenylmethane*

A solution of butadiene in hexane was polymerized with 0.002 part of butyllithium in the presence of 14 parts of triphenylmethane at 50° C. The polymer formed had an inherent viscosity of 2.5 and a cis-1,4-polymer content of 49.0 percent. In other cases of experiments performed at about this time in which no triphenylmethane was added the resulting polymer had an inherent viscosity of 5.66 and a cis- content of 36.1 percent.

A solution of butadiene in hexane was also polymerized at 50° C. with 0.003 part of TMDL per 100 parts of butadiene in the presence of 14 parts of triphenylmethane. The polymer formed had 62.3 percent cis-1,4-polymer addition. Polymer similarly formed without triphenylmethane had a much higher inherent viscosity and lower cis-1,4-polymer content.

TABLE III.—POLYMERIZATION OF BUTADIENE IN THE PRESENCE OF TRIPHENYLMETHANE

|  | Control |  | Control |  |
|---|---|---|---|---|
| Butadiene | 100 | 100 | 100 | 100 |
| Hexane | 565 | 590 | 565 | 612 |
| Butyllithium | 0.0019 | 0.002 |  |  |
| TMDL |  |  | 0.003 | 0.003 |
| Triphenylmethane |  | 14.0 |  | 14.0 |
| Temp., °C | 50 | 50 | 50 | 50 |
| Inherent viscosity | 5.66 | 2.5 | 14.4 |  |
| Microstructure: |  |  |  |  |
| cis-1,4-polymer (percent) | 36.1 | 49.0 | 35.4 | 62.3 |
| trans-1,4-polymer (percent) | 55.8 | 42.8 | 56.1 | 32.8 |
| 1,3-polymer (percent) | 8.1 | 8.3 | 8.5 | 4.9 |

The products obtained accordling to the invention had a higher cis-1,4 polymer content and lower inherent viscosity (where measured) than the respective controls.

*Example 4*

| Butadiene | 100 |
|---|---|
| Hexane | 450 |
| Temp., °C. | 65 |
| Conversion, percent | 60 |
| BuLi, p.h.m. of Li: |  |
| Initial | .00068 |
| Extra added | .00034 |
| Triphenylmethane, p.h.m. | 14 |
| Microstructure: |  |
| Cis-1,4 percent | 60.5 |
| Trans-1,4 do | 32.2 |
| 1,2 do | 7.3 |
| Inherent viscosity | 6.09 |

This example shows modification with production of a polymer of high cis- content and relatively low viscosity.

*Example 5*

The purpose of this experiment was to study the effect of phenanthrene on the polymerization of butadiene.

|  | Control | A | B | C |
|---|---|---|---|---|
| Butadiene | 100 | 100 | 100 | 100 |
| Hexane | 367 | 456 | 456 | 456 |
| Polybutadienyllithium, p.h.m. Li | 0.002 | 0.0021 | 0.00126 | 0.00092 |
| Phenanthrene, p.h.m | 0 | 0.043 | 0.115 | 0.286 |
| Temp., °C | 65 | 65-70 | 65-70 | 65-70 |
| Microstructure: |  |  |  |  |
| cis-1,4 (percent) | 68 | 75 | 80 | 80 |
| trans-1,4 (percent) | 25 | 20 | 15 | 16 |
| 1,2 (percent) | 7 | 5 | 5 | 4 |
| Inherent viscosity | 12.2 | 5.55 | 7.75 | 6.23 |

This illustrates the modifying effect of phenanthrene in the production of polybutadiene of high cis-1,4 polymer content.

*Example 6.—Isoprene and butyne-2*

A 10 percent solution of isoprene in pentane was charged into a bottle and 10 percent of the volume of the mix was boiled off on a sand bath yielding a solution of 100 parts of isoprene in 900 parts of pentane. Then a heptane suspension containing 0.005 part of TMDL per 100 parts of the isoprene charged was put into the bottle while the solution was still boiling. The bottle was capped and agitated by end-over-end rotation in a water bath. Another bottle was charged as above and treated in the same way except that 20 parts of butyne-2 per 100 monomer was added before the addition of the catalyst (TMDL).

After polymerization was complete, the bottles were opened, the polymers isolated and analyzed for microstructure and inherent viscosity.

The polymer made in the presence of butyne-2 was found to be of much lower inherent viscosity than the control and to have nearly the same cis-1,4-polymer content. Pertinent data is contained in Table VI.

TABLE VI.—THE EFFECT OF BUTYNE-2 ON THE INHERENT VISCOSITY OF POLYISOPRENE (POLYMERIZATION RECIPES: 100 ISOPRENE, 900 PENTANE, 0.005 TMDL)

| Butyne-2 | Inherent viscosity | Gel, percent | cis-1,4 Polymer, percent [1] | trans-1,4 Polymer, percent [1] | 3,4 Polymer, percent [1] | T.F., percent [2] | Net cis-1,4 Polymer, percent [3] |
|---|---|---|---|---|---|---|---|
| 0 | 11.5 | 0 | 86.6 | 5.6 | 7.8 | 88.4 | 76.4 |
| 20 | 4.94 | 0 | 84.7 | 6.8 | 8.5 | 90.7 | 76.8 |

[1] The given percentages of the three structures (the cis-1,4 polymer, the trans-1,4 polymer and the 3,4 polymer) have been adjusted to total 100%.
[2] T.F.=Total unsaturation found by infrared analysis divided by weight of sample.
[3] Net cis value=The first percentage of cis-1,4 polymer times the "Total Found" percentage. It shows that of the 90% (approximately) of structures measured by infrared, the cis content in both polymers was substantially equal.

NOTE.—The 0.005 part TMDL used represents a large excess of catalyst and would account for the lower than usual cis-polymer content of both the control and the experimental polymer.
The molecular weight of the polymer made with butyne-2 (as shown by the inherent viscosity) has been lowered materially without substantial effect on the cis-content.

*Example 7.—Isoprene and butyne-2*

The following experiment shows that polyisoprene of very good microstructure can be obtained in the presence of butyne-2, even at elevated temperatures.

Isoprene (commercial quality) containing 2.4 percent butyne-2 was dissolved in hexane containing 0.63 percent butyne-2 (recovered from a previous run) and polymerized at 50° C. and 70° C. with 0.0012 TMDL. (A control run was made in pentanes not containing additional butyne-2.) The total butyne-2 level was 7.9 parts by weight per 100 parts of isoprene. The polyisoprene formed at both 50° C. and 70° C. had 92.7 percent cis-1,4-polymer content while the cis-1,4-polymer content of the control was 91.3 percent (Table VII).

TABLE VII

| Isoprene | 100 | 100 | 100 |
|---|---|---|---|
| Hexane | 565 | 565 | |
| Pentane | | | 565 |
| Total Butyne-2 | 7.9 | 7.9 | 2.4 |
| TMDL | 0.0012 | 0.0045 | 0.0035 |
| Temp., °C | 70 | 50 | 50 |
| Microstructure: | | | |
| cis-1,4-polymer (percent) | 92.7 | 92.7 | 91.3 |
| trans-1,4-polymer (percent) | 0.0 | 0.0 | 1.3 |
| 1,2-polymer (percent) | 0.0 | 0.0 | 0.0 |
| 3,4-polymer (percent) | 7.3 | 7.3 | 7.4 |

The results demonstrate that a polymer of very high cis-content can be obtained using butyne-2.

*Example 8.—Isoprene and fluorene*

A solution of isoprene in mixed pentanes was polymerized with TMDL at 50° C. in the presence of 0.06 part of fluorene. A control was run without the fluorene. The inherent viscosity of the control was 13.9, while that of the experimental polymer was only 5.8. However, accompanying this great drop in viscosity was a small drop in cis-polymer content—from 88.6 percent for the control to 83.2 percent for the other polymer (Table VIII).

TABLE VIII

| Isoprene | 100 | 100 |
|---|---|---|
| Mixed pentanes | 900 | 900 |
| TMDL | 0.003 | 0.003 |
| Fluorene | 0 | 0.06 |
| Temp., °C | 50 | 50 |
| Inherent viscosity | 13.9 | 5.8 |
| Microstructure: | | |
| cis-1,4-polymer (percent) | 88.6 | 83.2 |
| trans-1,4-polymer (percent) | 4.2 | 8.4 |
| 1,2-polymer (percent) | 0.0 | 0.0 |
| 3,4-polymer (percent) | 7.2 | 8.4 |

The cis-1,4 polymer content is somewhat below that obtainable by the process of this invention, perhaps because of low polymer purity or the use of too high a temperature for this system. However, the inherent viscosity is appreciably lower than when no modifier was employed.

MODIFICATION BY MEANS OF PRODUCT FORMED IN SITU FROM ORGANOLITHIUM CATALYST AND CHLOROTRIPHENYLMETHANE

The reaction between chlorotriphenylmethane and n-butyllithium was studied. Two reactions between them are possible:

Reaction I:

$$BuLi + (C_6H_5)_3CCl \rightarrow (C_6H_5)_3CLi + BuCl$$

Reaction II:

$$BuLi + (C_6H_5)_3CCl \rightarrow BuC(C_6H_5)_3 + LiCl$$

To the extent that Reaction II goes forward, non-catalytic LiCl is formed and the lithium is lost as far as its use as a catalyst is concerned.

$(C_6H_5)_3CLi$ cannot lose carbon-bound Li to $$(C_6H_5)_3CCl$$

in a Li-Cl interchange reaction because $(C_6H_5)_3CLi$ would be reformed.

During experiments on making a pre-formed catalyst/modifier mix, it was found that even using an excess of $(C_6H_5)_3CCl$ over that required for an equimolecular reaction with the BuLi in a benzene solution, carbon-bound Li remains in the reaction mixture. Presumably, this is $(C_6H_5)_3CLi$ because any BuLi present would have followed one of the above reactions to produce $$(C_6H_5)_3CLi + BuCl$$

or $BuC(C_6H_5)_3 + LiCl$. Although the reaction $$BuCl + (C_6H_5)_3CLi$$

to form $LiCl + BuC(C_6H_5)_3$ can be envisioned, it cannot take place as a major reaction, because after several days the mix made with an excess of $(C_6H_5)_3CCl$ *did* actually catalyze polymerization. (Experiments in this laboratory have shown $(C_6H_5)_3CLi$ to be an effective catalyst for the polymerization of conjugated dienes.)

However, in hexane or other aliphatic solvents (which are less polar than benzene) only Reaction II takes place:

$$BuLi + (C_6H_5)_3CCl \rightarrow BuC(C_6H_5)_3 + LiCl$$

This is proven by the fact that in the following experiment no polymerization took place when roughly stoichiometric amounts of butyllithium and trityl chloride (chlorotriphenylmethane) were used even with a very large amount of catalyst. Actually, in Run A (below) a very slight excess of butyllithium over trityl chloride was used. The total butyllithium was ten times that of the control which proceeded without extra catalyst addition. It was only after a slight increment of catalyst was added that polymerization took place in Run A—a larger amount being required in Run B in which a larger excess of trityl chloride was present.

If significant amounts of either butyllithium or $(C_6H_5)_3CLi$ were present for an appreciable length of time, polymerization would have proceeded readily at the initial charge. Reaction II must have been quantitative.

As a glance at Example 9 will show, polymers of cis-1,4 content much higher than the control were made in both Runs A and B, and the polymers had much lower inherent viscosities than the control. The amounts given represent parts per 100 parts of monomer (p.h.m.) or millimoles (mM.).

*Example 9*

|  | Control | Run A | Run B |
| --- | --- | --- | --- |
| Butadiene | 100 | 100 | 100 |
| Hexane | 550 | 455 | 455 |
| BuLi, p.h.m. of Li | 0.0009 | ¹.0096 | ¹.0096 |
| Tritylchloride mM/100 grams of butadiene |  | 1.28 | 1.98 |
| Excess Li over tritylchloride, p.h.m. |  | ¹0.0011 |  |
| Initial Temp., °C | 50 | 65 | 65 |
| Propagation Temp., °C | 50 | 50 | 50 |
| Time, days |  | 4 | 4 |
| Properties: |  |  |  |
| Inherent viscosity | 13.0 | 6.71 | 6.02 |
| cis-1,4 content, percent | 56.0 | 82.8 | 73.3 |
| trans-1,4 content, percent | 37.0 | 13.4 | 21.9 |
| 1,2-content, percent | 7.0 | 3.8 | 4.8 |
| Conversion, percent |  | 78 | 79 |

¹ No polymerization took place until more butyllithium catalyst was added. In Runs A and B tiny increments of BuLi were added occasionally to keep the polymerization going.

What I claim is:

1. In the process of producing an elastomer by polymerization of aliphatic hydrocarbon monomers of the class consisting of conjugated dienes containing 4 to 12 carbon atoms and mixtures of such conjugated dienes with olefins, in an inert solvent in a monomer-to-solvent ratio ratio of 2 to 100 parts by weight of monomer to 98 to 0 parts of solvent, with catalyst of the class consisting of lithium and organolithium catalyst at a temperature between substantially −10° C. up to the boiling point of the constituents of the reaction under the conditions employed, the improvement which consists of carrying out the polymerization in the presence of a hydrocarbon chain terminator which possesses at least as much metalation-reaction activity as diphenylmethane and is less reactive than acetylene and thereby obtaining an elastomer with a higher cis-1,4 polymer content and a lower molecular weight than obtained under identical polymerization conditions in the absence of the chain terminator.

2. The process of claim 1 in which the monomer is butadiene.

3. The process of claim 1 in which the monomer is isoprene.

4. The process of claim 1 in which butadiene is polymerized in an alkane solution at a temperature of 30 to 90° C. using butyne-2 as chain terminator.

5. The process of claim 1 in which butadiene is polymerized in an alkane solution at a temperature of 30 to 90° C. using triphenylmethane as chain terminator.

6. The process of claim 1 in which butadiene is polymerized in an alkane solution at a temperature of 0 to 60° C. using fluorene as chain terminator.

7. The process of claim 1 in which isoprene is polymerized in an alkane solution at a temperature of 15 to 70° C. using butyne-2 as chain terminator.

8. The process of claim 1 in which isoprene is polymerized in an alkane solution at a temperature of 15 to 70° C. using triphenylmethane as chain terminator.

9. The process of claim 1 in which isoprene is polymerized in an alkane solution at a temperature of 0 to 60° C. using fluorene as chain terminator.

10. The process of claim 1 in which phenanthrene is the chain terminator.

11. The process of claim 1 in which butadiene is polymerized in an alkane solution and phenathrene is used as the chain terminator.

12. The process of claim 1 in which an organolithium catalyst is used in an aliphatic solvent and the chain terminator is formed by reaction of the organolithium catalyst and a compound added to the reactants of the polymerization mix.

13. The process of claim 12 in which chlorotriphenylmethane is the compound in the polymerization mix with which the catalyst reacts.

References Cited

UNITED STATES PATENTS 2,913,444  11/1959  Diem et al. _____ 260—94.2
3,067,187  12/1962  Greenberg et al. ____ 260—94.2

JOSEPH L. SCHOFER, *Primary Examiner.*

H. I. CANTOR, *Assitsant Examiner.*